United States Patent [19]

Banucci et al.

[11] 4,098,800

[45] Jul. 4, 1978

[54] PROCESS FOR PREPARING POLYETHERAMIDE-ACIDS

[75] Inventors: Eugene G. Banucci, Mt. Vernon, Ind.; Martin A. Byrne, Troy, N.Y.

[73] Assignee: General Electric Company, Schenectady, N.Y.

[21] Appl. No.: 788,248

[22] Filed: Apr. 18, 1977

[51] Int. Cl.$^2$ .............................. C07D 307/91
[52] U.S. Cl. .................. 260/346.3; 260/448.2 B; 260/516; 260/517; 260/519
[58] Field of Search ............ 260/346.3, 516, 517, 260/519, 448.2 B

[56] References Cited

U.S. PATENT DOCUMENTS

| | | | |
|---|---|---|---|
| 3,847,867 | 11/1974 | Heath et al. | 260/47 CP |
| 3,991,004 | 11/1976 | Takekoshi et al. | 260/37 N |

OTHER PUBLICATIONS

Dine–Hart et al., J. of Applied Polymer Science, vol. 11, (1967), pp. 609–626.

*Primary Examiner*—Richard L. Raymond
*Attorney, Agent, or Firm*—R. G. Jackson; J. T. Cohen; M. Snyder

[57] ABSTRACT

Disclosed is a process for preparing oligomeric polyetheramide-acid by reacting an aromatic dianhydride component including an aromatic bis(ether anhydride) with an organic diamine in an inert organic liquid selected from methylene chloride, chloroform, 1,2-dichloroethane, and mixtures thereof with acetone. The oligomeric polyetheramide-acid is substantially insoluble in the inert organic liquid, in which the oligomer typically appears as a precipitate which may be recovered in powder or finely divided particulate form without need for grinding.

20 Claims, No Drawings

PROCESS FOR PREPARING POLYETHERAMIDE-ACIDS

This invention relates to a process for preparing polyetheramide-acid, and more particularly to a process for preparing finely divided particles of oligomeric polyetheramide-acid.

Insulated electrical conductors, e.g. insulated magnet wire, are made commercially by coating the conductors with organic solvent solutions of heat curable resins, e.g. wire enamel, and removing the solvents by volatilization during subsequent cure of the resins. For example, as shown by U.S. Pat. No. 3,847,867 (Heath and Wirth), it is known that polyamide acid solutions prepared by reacting aromatic bis(etheranhydride) and organic diamines in dipolar aprotic organic solvents under ambient conditions may be used as wire coating enamel. However, solution coating compositions for insulating electrical conductors have not been entirely satisfactory for reasons such as high cost of the solvents which typically are not economically recoverable, substantial energy requirements for volatilization of the solvents, and economic and environmental problems involved in disposal of the solvents. Accordingly, there is a substantial need in the art for solventless compositions (e.g. powder resins) for insulating electrical conductors. However, preparation of powder coating resins has heretofore typically required grinding or other mechanical size reduction of the resins to form small particles or powder suitable for powder coating application.

It has now been found that oligomeric polyetheramide-acid can be prepared by reacting an aromatic dianhydride component including an aromatic bis(ether anhydride) with an organic diamine in an inert organic liquid selected from methylene chloride, chloroform, 1,2-dichloroethane, and mixtures thereof with acetone. Surprisingly, the oligomeric polyetheramide-acid is substantially insoluble in the inert organic liquid, in which the oligomer typically appears as a precipitate which may be recovered in powder or finely divided particulate form without need for grinding. The substantial insolubility of the polyetheramide-acid oligomers in the above liquids was entirely unexpected since polyetherimides prepared from bis(ether anhydride)s of formula I below and diamines of formula III below are soluble in methylene chloride and chloroform, as shown by U.S. Pat. No. 3,991,004 (Takekoshi et al.). Advantageously, the present process for preparing oligomeric (i.e. low molecular weight) polyetheramide-acid does not require chain stopping agents, such as monofunctional organic amines and monofunctional organic anhydrides, to provide molecular weight control.

Generally stated, the present invention provides a process for preparing oligomeric polyetheramide-acid, comprising reacting an aromatic dianhydride component selected from the group consisting of (a) aromatic bis(ether anhydride)s of the general formula

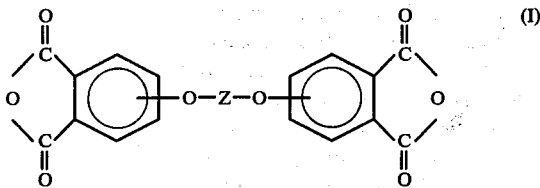

and (b) mixtures of one or more of said bis(ether anhydride)s with up to 30 mole percent benzophenone dianhydride of the general formula

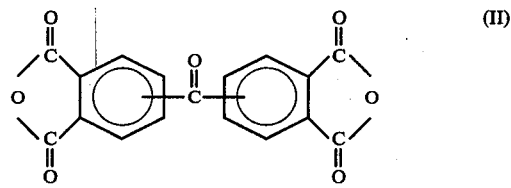

with at least one organic diamine of the general formula $$H_2N—R—NH_2 \qquad (III)$$

in an inert organic liquid selected from the group consisting of (c) chlorinated hydrocarbon selected from the group consisting of methylene chloride, chloroform, 1,2-dichloroethane, and mixtures thereof and (d) mixtures of said chlorinated hydrocarbon with up to 50% by weight of acetone to form oligomeric polyetheramide-acid which is substantially insoluble in said liquid.

In a preferred embodiment, the oligomeric polyetheramide-acid is formed as finely divided particles which are substantially insoluble in the organic liquid and precipitate from solution.

In the above formulas Z is a member selected from the class consisting of (a) divalent organic radicals having the following formulas

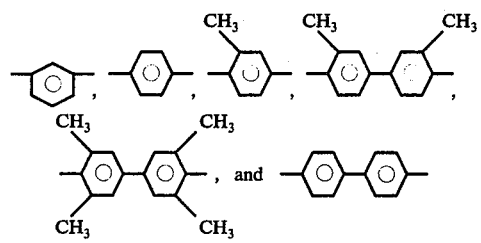

and (b) divalent organic radicals of the general formula

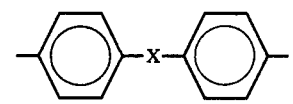

where X is a member selected from the class consisting of divalent radicals of the formulas

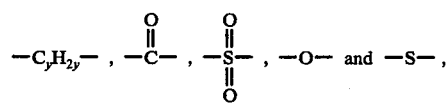

where y is an integer from 1 to 5, and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the general formula

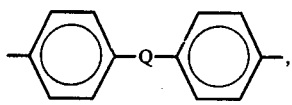

where Q is a member selected from the class consisting of —O—, —S—, and —$C_xH_{2x}$—, where x is an integer from 1 to 5.

Bis(ether anhydride)s of formula I include, for example,
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride; and
1,4-bis(3,4-dicarboxyphenoxy)benzene dianhydride.

A preferred class of aromatic bis(ether anhydride)s included by formula I includes compounds of formulas IV to VI, which follow:

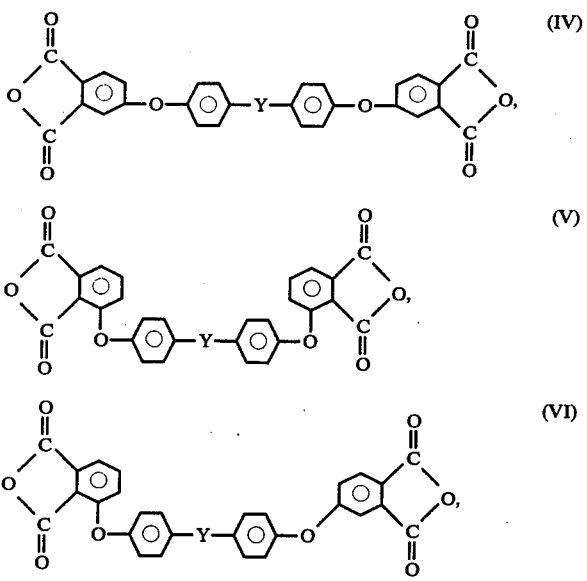

and mixtures thereof, where Y is selected from the class consisting of —O—, —S—,

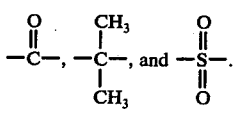

Aromatic bis(ether anhydride)s of formula IV include, for example:
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
and mixtures thereof.

Aromatic bis(ether anhydride)s of formula V include, for example:
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
and mixtures thereof.

The aromatic bis(ether anhydride) of formula VI may be, for example,
4-(2,3-dicarboxyphenoxy)-4'-(3,4-dicarboxyphenoxy)-diphenyl-2,2-propane dianhydride.

Aromatic bis(ether anhydride)s especially preferred herein are 2,2-bis[4-(3,4-dicarboxyphenoxy)phenyl] propane dianhydride, 2,2-bis[4-(2,3-dicarboxyphenoxy)-phenyl] propane dianhydride; 4-(2,3-dicarboxyphenoxy)-4'-(3,4-dicarboxyphenoxy)diphenyl-2,2-propane dianhydride; and mixtures thereof.

Some of the aromatic bis(ether anhydride)s of formula (1) are shown in U.S. Pat. No. 3,972,902 (Darrell Heath and Joseph Wirth). As described therein, the bis(ether anhydride)s can be prepared from the hydrolysis, followed by dehydration, of the reaction product of a nitro-substituted phenyl dinitrile with a metal salt of a dihydric phenol compound in the presence of a dipolar aprotic solvent.

Additional aromatic bis(ether anhydride)s also included by Formula I are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967, and by M. M. Koton, F. S. Florinski, Zh. Org. Khin, 4 (5), 774 (1968).

The organic diamines of Formula III include, for example:
o-phenylenediamine,
m-phenylenediamine,
p-phenylenediamine,
4,4'-diaminodiphenylpropane,
4,4'-diaminodiphenylmethane (commonly named 4,4'-methylenedianiline),
4,4'-diaminodiphenyl sulfide (commonly named 4,4'-thiodianiline),
4,4'-diaminodiphenyl ether (commonly named 4,4'-oxydianiline),
1,5-diaminonaphthalene,
3,3'-dimethylbenzidine,
3,3'-dimethoxybenzidine,
2,4-bis(β-amino-t-butyl)toluene,
bis(p-β-amino-t-butylphenyl)ether,
bis(p-β-methyl-o-aminopentyl)benzene,
1,3-diamino-4-isopropylbenzene,
1,2-bis(3-aminopropoxy)ethane,
benzidine,
m-xylylenediamine,
p-xylylenediamine, 2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane,
and mixtures of such diamines.

Organic diamines preferred herein are 4,4'-methylenedianiline, 4,4'-oxydianiline, meta-phenylenediamine, and mixtures thereof.

Benzophenone dianhydrides included by formula II include 3,3',4,4'-benzophenone tetracarboxylic acid dianhydride, 2,2',3,3'-benzophenone tetracarboxylic acid dianhydride, and mixtures thereof. The 3,3',4,4'-isomer is preferred and is referred to herein for simplicity as BTDA.

In carrying out the process, the dianhydride component is preferably initially dissolved in an organic liquid selected from a first group consisting of methylene chloride; chloroform; 1,2-dichloroethane; and mixtures thereof to form a first solution. The diamine is preferably initially dissolved in an organic liquid selected from a second group consisting of methylene chloride; chloroform; 1,2-dichloroethane; acetone; and mixtures thereof to form a second solution. Thereafter, the first and second solutions are admixed and the resulting reaction mixture is advantageously agitated by vigorous stirring. Typically, the oligomeric polyetheramide-acid products are formed in finely divided particulate form and precipitate in less than 2 minutes and often in less than 30 seconds. Agitation advantageously aids in effecting formation of substantially spherical particles, which when recovered and dried are eminently suitable for obtaining good substrate coverage in powder coating applications. Although acetone is a better solvent that the chlorinated hydrocarbons for some of the diamines useful herein, the chlorinated hydrocarbons are generally better nonsolvents or precipitating agents for the polyetheramide-acid products. Inclusion of acetone in the reaction mixture in amounts more than 50 percent by weight based on the total weight of the organic liquid may result in formation of high molecular weight polyetheramide-acids and failure to precipitate the desired finely divided particulate oligomers. In general, the number average molecular weight of the oligomers prepared by the process of this invention is less than 5000.

Any suitable concentration of reactants may be employed in the solutions. In general, smaller oligomer particles are formed using dilute solutions of the reactants. For powder coating use it is desirable that the oligomer particles have an average particle size in the range of from about 0.5 to about 70 microns, and preferably from about 0.5 to about 20 microns. In general, it is found that if the concentrations of the two solutions are selected such that admixture thereof results in a reaction mixture containing from about 1 to about 25 percent by weight of reactants, and preferably from about 1 to about 15 percent by weight, based on the weight of reaction mixture, at least 90 percent by weight(dry basis) of the resulting precipitated particles have an average particle size of from about 0.5 to about 70 microns and usually from about 0.5 to about 20 microns.

The reaction may be effected at any suitable temperature, e.g. from 0° C or less up to the boiling point of the organic liquid at the pressure employed. Conveniently, the reaction may be effected at a temperature from about 20° to about 30° C under atmospheric pressure.

After the oligomeric polyetheramide-acid precipitate product is formed, it may be recovered in substantially pure form by filtering, washing, and drying. Alternatively, a particulate mixture of oligomer and any unreacted dianhydride and diamine may be recovered by volatilizing substantially all the liquid solvent from the reaction mixture.

Oligomeric polyetheramide-acid may be prepared by the present process using equimolar amounts of diamine and the dianhydride component. Alternatively, either the diamine or the dianhydride component may be employed in molar excess. A surprising feature of this invention is that, in general, the oligomeric polyetheramide-acids are at least predominately amine capped, i.e. the end groups of the oligomers are at least predominately amine groups, regardless of whether the amine or dianhydride or neither of the reactants is added in molar excess. However, as a general preference the amine is added in an amount from about 1 to about 1.5 moles and more preferably from about 1.2 to about 1.33 moles per mole of dianhydride component.

In a preferred embodiment the process is carried out in a continuous manner as next described. A stream of a first solution of the dianhydride reactant in the above-described chlorinated hydrocarbon liquid solvent therefor is continuously combined with a stream of a second solution of the diamine reactant in the above-described liquid solvent therefor. The resulting third stream being continuously formed is continuously passed through a mixing zone to intimately mix the diamine with the dianhydride component. The intimately mixed third stream is continuously passed to a liquid-solids separation zone, which may be for example a spray drying chamber. Substantially dry finely divided particles of oligomeric polyetheramide-acid are continuously recovered from the separation zone.

Practice of the present invention is further illustrated by the following non-limiting examples. Throughout this description and the claims which follow all parts and percentages are by weight unless otherwise indicated.

As used herein, the sintering temperature means the lowest temperature at which solvent-free polyetheramide-acid particles show adherence to themselves and to a substrate, but show no significant viscous flow or leveling. As used herein, viscous flow temperature means the lowest temperature at which individual polymer particles lose all angularity and show a rounded or uniform curved surface at the air-melt interface — usually resembling a hemispherical droplet with the largest cross-section at a substrate-melt interface. In general, polymer powders at the viscous flow temperature will form a film but will not necessarily flow out to form a completely smooth surface. As used herein, the leveling temperature means the lowest temperature at which a resin powder flows and flattens to give a thin film with a glossy surface wherein a group of resin particles coalesce to form a flat upper surface and exhibit an obvious curvature at the contact angle surrounding a periphery of a coalesced resin powder.

In the examples which follow, the sintering, viscous flow, and leveling temperatures for the resin powders were determined according to the following test sequence. A series of solvent-free powder portions (0.1 to 0.5 mg.) having an average particle size of 200 microns or less were sprinkled onto preheated glass slides resting on temperature gradient blocks at temperature intervals of about 5° C. over a temperature range of from about 130° to about 250° C. After 5 minutes, the glass slides were removed from each temperature gradient block position, allowed to cool at room temperature and the polymer particles were examined with a stereoscopic microscope at 45X magnification. The temperatures at which the polymer particles reached their sintering temperature, viscous flow temperature or leveling temperature were recorded.

The amine content, anhydride content and amide-acid content of the oligomers prepared in the following examples were determined using the potentiometric titration procedures next described. Amine content was determined by dissolving a known amount (approximately 0.2 gram) of sample in 25cc of liquified phenol (approximately 90 parts phenol and 10 parts water) and thereafter titrating with approximately 0.18N methanesulfonic acid dissolved in a mixture of 150 parts by volume of methanol and 70 parts by volume of benzene. Amide-acid and anhydride contents were determined by dissolving a known amount (about 0.05 gram) of sample in a mixture of 1cc water and 2cc N-methyl-2-pyrrolidone. After allowing one hour for hydrolysis of any anhydride present to dicarboxylic acid end groups, 25cc of pyridine was added and the sample was titrated with approximately 0.08N tetrabutylammonium hydroxide (TBAH) prepared by diluting 1N methanolic TBAH with 100/30 methanol benzene solution. (The two acid groups derived from the anhydride hydrolysis are stronger and weaker, respectively, than the amide-acid). If anhydride was present in the original unhydrolyzed sample, the stronger anhydride-derived carboxylic acid titrates first with a rather poorly defined endpoint (A). The amide acid titrates next, with a well-defined end point (B). The weaker anhydride-derived carboxylic acid titrates last, as indicated by a well-defined end point (C) if no imide is present. In such instance, the anhydride content in the original sample is considered equivalent to the milliequivalents (meq) of base consumed from end-point B to end-point C. The amide acid in the sample is considered equivalent to total base consumed up to end point B minus the anhydride content. If imide is present, the end point for the weaker carboxylic acid is less well-defined because imide ring opening commences as soon as the weak acid has been neutralized. In this instance the choice of end point C is less well-defined and the values for the strong and weak anhydride-derived carboxylic acids are averaged to compute the anhydride content of the original sample. The amount of imide present, if any, can be determined by the procedure described in U.S. Pat. No. 3,892,716 (Edith Boldebuck).

Particle size was measured using the Coulter Counter technique with the powder suspended in 3 percent aqueous sodium chloride.

EXAMPLE 1

This example illustrates the preparation of an amine capped polyetheramide-acid oligomer from a reaction mixture containing equimolar amounts of a diamine and a bis(ether anhydride).

A 5 percent solution of 2,2-bis[4-(3,4-dicarboxyphenoxy)phenyl] propane dianhydride (4,4'-BPADA) was prepared by dissolving 6.50 grams (0.0125 mole) of 4,4'-BPADA in a sufficient amount of methylene chloride in a first flask. A 5 percent solution of 4,4'-methylene dianiline (MDA) was prepared by dissolving 2.47 grams (0.0125) moles of MDA in a sufficient amount of methylene chloride in a second flask. The 4,4'-BPADA solution and the MDA solution were added rapidly and simultaneously with vigorous stirring, at room temperature (about 21°-25° C), to a 500-milliliter beaker, resulting in formation of a precipitate product within several seconds. Stirring was continued for about 10 minutes and thereafter the precipitate product was separated from the reaction mixture by filtration. The product residue was washed with methylene chloride and thereafter dried under vacuum at room temperature to provide finely divided free flowing particles. Based on method of preparation and titration of the product for amine content, anhydride content, and amide-acid content, the product was a low molecular weight oligomeric polyetheramide-acid adduct of MDA and 4,4'-BPADA, substantially all the end groups of which were amine groups. The number average molecular weight ($\overline{MW}_n$) of the polyetheramide-acid was 2857 as calculated from the formula:

$$\overline{MW}_n = \frac{2 \times 100}{\text{milliequivalents of amine/gram}}$$

When equimolar amounts of the same reactants are reacted in organic liquids which are good solvents for polyetheramide-acids, e.g. N-methyl-2-pyrrolidone, polymers of substantially higher molecular weight (e.g. 10,000 to 30,000) are usually obtained.

EXAMPLES 2-7

The procedure of Example 1 was repeated using molar excesses of 4,4'-methylene dianiline (MDA) ranging from 3:2 to 8:7 moles of MDA: moles of 4,4'-BPADA. In each of these examples, the concentration of the reactants was 5 percent in methylene chloride. As shown by the data in Table I below, the number average molecular weight of the resulting polyetheramide-acid oligomers decreases as the mole ratio of MDA to 4,4'-BPADA increases. Table I also shows the amounts of reactants used and the amounts in milliequivalents of amine, anhydride, and amicacid (amide-acid) found per gram of oligomer. The corresponding data for Example I is also included in Table I.

Particle size tests performed on other oligomeric polyetheramide-acids prepared according to this invention indicate that at least about 90 percent of the finely divided oligomers of Examples 1-7 have an average particle size in the range from about 0.5 to about 10 microns.

TABLE I

| | MDA:4,4'-BPADA | Reactants Added | | | | Oligomer Properties | | | |
|---|---|---|---|---|---|---|---|---|---|
| | | MDA[a] | | 4,4'-BPADA[b] | | | Milliequivalents/gram[d] | | |
| Example | Mole Ratio | grams | moles | grams | moles | $MW_n$[c] | Amine | Anhydride | Amide-Acid |
| 1 | 1:1 | 2.47 | 0.0125 | 6.50 | 0.0125 | 2857 | 0.70 | nil | 2.56 |
| 2 | 8:7 | 2.38 | 0.012 | 5.46 | 0.0105 | 2597 | 0.77 | nil | 2.52 |
| 3 | 7:6 | 2.78 | 0.014 | 6.25 | 0.012 | 2381 | 0.84 | nil | 2.53 |
| 4 | 6:5 | 2.38 | 0.012 | 5.20 | 0.010 | 2326 | 0.86 | nil | 2.48 |
| 5 | 5:4 | 1.98 | 0.010 | 4.16 | 0.008 | 2247 | 0.89 | nil | 2.43 |
| 6 | 4:3 | 2.38 | 0.012 | 4.68 | 0.009 | 2041 | 0.98 | nil | 2.39 |
| 7 | 3:2 | 2.38 | 0.012 | 4.16 | 0.008 | 1818 | 1.10 | nil | 2.41 |

[a] 4,4'-methylene dianiline
[b] 2,2-bis[4-(3,4-dicarboxyphenoxy)phenyl]propane dianhydride
[c] number average molecular weight calculated on the basis of amine content as shown in Example 1
[d] determined by potentiometric titration as described in text preceding Example 1

EXAMPLES 8-14

In these examples, the procedure of Example 1 was repeated except as indicated below. Approximately 10 percent solutions of 4,4'-methylene dianiline (MDA) and 2,2-bis[4-(3,4-dicarboxyphenoxy)phenyl] propane dianhydride (4,4'-BPADA) were admixed in various proportions such that the mole ratio of MDA:4,4'-BPADA in the resulting reaction mixture was as indicated in Table II below. After stirring for about 10 minutes, the resulting finely divided particulate polyetheramide acid precipitate was recovered, in admixture with any unreacted MDA and/or 4,4'-BPADA, as a substantially solvent-free product by removing the methylene chloride in two steps as follows: (1) a stream of nitrogen at room temperature was blown across the beaker containing the reaction mixture for about 2-3 hours, followed by (2) evaporation under vacuum.

The melt character of the resulting substantially solvent-free oligomeric particulate products was found using the procedures therefor set forth in the description preceding the examples. The results are shown in Table II below.

Table II

| | MDA:4,4'-BPADA | Melt Character, °C | | |
|---|---|---|---|---|
| Example | Mole Ratio | Sinter | Viscous Flow | Leveling |
| 8 | 3:2 | 165 | 195 | 210 |
| 9 | 4:3 | 185 | 195 | 220 |
| 10 | 5:4 | 195 | 205 | 225 |
| 11 | 6:5 | 195 | 205 | 225 |
| 12 | 7:6 | 190 | 200 | 230 |
| 13 | 8:7 | 195 | 200 | 230 |
| 14 | 1:1 | 195 | 200 | 230 |

The data shows that the finely divided oligomeric polyetheramide-acid powders of these examples have suitable melt character (i.e., sinter, viscous flow, and leveling temperatures) for application to substrates such as copper and aluminum wire using fluid bed electrostatic coating procedures which are well known in the wire insulation art. Based on the melt character, it is believed that the number average molecular weight of the polyetheramide acids in each of these examples is below 5000.

EXAMPLES 15-21

In these examples, various diamines were reacted at room temperature (about 21°-25° C) with 2,2-bis[4-(3,4-dicarboxyphenoxy)phenyl] propane dianhydride (4,4'-BPADA) using the procedure of Example 1 except as indicated. Table III sets forth the type and amount of diamine added, the amount of 4,4'-BPADA added, the type and amount of solvent present in the solutions of the diamines and the 4,4'-BPADA, the mole ratio of diamine to 4,4'-BPADA in the reaction mixture formed by admixing the solutions of the diamine and 4,4'-BPADA, and the percent acetone in the total solvent in the reaction mixture.

TABLE III

| | Diamine: 4,4'-BPADA | 4,4'-BPADA Solution | | | Diamine Solution | | | Solvent | | % Acetone in Total Solvent |
|---|---|---|---|---|---|---|---|---|---|---|
| Ex. | Mole Ratio | Conc. | g.4,4'-BPADA | g.CH$_2$Cl$_2$ | Type[a] | grams | Conc. | g.CH$_2$Cl$_2$ | g. Acetone | in Reaction Mixture |
| 15 | 11:10 | 10% | 10.41 | 94 | OPD | 2.31 | 9.9% | 21 | 0 | 0 |
| 16 | 11:10 | 10% | 9.05 | 81 | TDA | 4.20 | 5% | 80 | 0 | 0 |
| 17 | 11:10 | 10% | 10.41 | 94 | DAT | 2.69 | 2.1% | 128 | 0 | 0 |
| 18 | 11:10 | 10% | 10.41 | 94 | MDA | 4.36 | 9.8% | 40 | 0 | 0 |
| 19 | 11:10 | 8.3% | 10.41 | 115 | ODA | 4.49 | 4.5% | 0 | 95 | 45% |
| 20 | 11:10 | 10% | 10.41 | 94 | MDA | 4.36 | 6.8% | 0 | 60 | 39% |
| 21 | 1:1 | 10% | 10.41 | 94 | MDA | 3.96 | 6.2% | 0 | 60 | 39% |

[a] OPD is ortho-phenylenediamine; TDA is 4,4'-thiodianiline; DAT is 2,4-diaminotoluene; ODA is 4,4'-oxydianiline; MDA is 4,4'-methylenedianiline.

A precipitate product formed within several seconds after admixing the 4,4'-BPADA and diamine solutions with vigorous stirring. After stirring for about 10 minutes, the resulting finely divided particulate polyetheramide acid precipitate was recovered, in admixture with any unreacted 4,4'-BPADA and/or diamine, by removing the methylene chloride or methylene chloride and acetone using the solvent removal procedure therefor of Examples 8-14.

The melt character of the resulting substantially solvent-free oligomeric particulate products was found using the procedures therefor set forth in the description preceding the examples. The results are shown in Table IV below.

TABLE IV

| | Melt Character, °C | | |
|---|---|---|---|
| Example | Sinter | Viscous Flow | Leveling |
| 15 | 155 | 160 | 170 |
| 16 | 185 | 195 | 220 |
| 17 | 185 | 195 | 215 |
| 18 | 185 | 200 | 225 |
| 19 | 185 | 220 | 225 |
| 20 | 190 | 210 | 230 |
| 21 | 190 | 205 | 230 |

Based on the melt character, it is believed that the number average molecular weight of the polyetheramide acids in Examples 15–21 is below 5000.

EXAMPLE 22

In a first flask 2,2-bis[4-(3,4-dicarboxyphenoxy)phenyl] propane dianhydride, i.e. 4,4'-BPADA, (14.05 grams, 0.027 mole) and 4,4'-benzophenone tetracarboxylic acid dianhydride, i.e. 4,4'-BTDA, (0.966 grams, 0.003 mole) were dissolved in approximately 500 grams of methylene chloride to form a 3 percent mixed dianhydride solution. In a second flask 4,4'-methylenedianiline (7.9 grams, 0.04 mole) was dissolved in approximately 158 grams of methylene chloride to form a 5 percent diamine solution. The mixed dianhydride solution and the diamine solution were added rapidly and simultaneously with vigorous stirring at room temperature (about 21°–25° C) to a 500-milliliter beaker, resulting in formation of a precipitate within several seconds. Stirring was continued for about 10 minutes and thereafter the finely divided precipitate was recovered, in admixture with any unreacted dianhydride and/or diamine, using the solvent removal procedure of Examples 8–14. Tests showed that the melt characteristics of the substantially solvent-free oligomeric polyetheramide-acid copolymer were as follows: sintering temperature, 180° C; viscous flow temperature, 190° C; leveling temperature, 230° C. Based on the melt characteristics, it is believed that the number average molecular weight of the oligomeric copolymer was below 5000.

EXAMPLE 23

This example illustrates the preparation of an oligomeric polyetheramide acid reaction product of hexamethylene diamine (HMD) and 2,2-bis[4-(3,4-dicarboxyphenoxy)phenyl] propane dianhydride using the procedure of Example 1. A methylene chloride solution containing 5 percent 4,4'-BPADA (5.2 grams, 0.01 mole) was admixed with a methylene chloride solution containing 5 percent HMD (1.45 grams, 0.0125 mole). A precipitate formed immediately. After stirring for 15 minutes at room temperature, filtering, and washing and drying the precipitate product, titration thereof showed that it contained 1.80 meq of amine per gram, 2.35 meq of amide-acid per gram, and substantially no anhydride. The number average molecular weight calculated from the amine end group content was 1111. Based on method of preparation and the titration analysis, the finely divided particulate product was an oligomeric polyetheramide-acid adduct of HMD and 4,4'-BPADA.

EXAMPLE 24

A first methylene chloride solution containing 10 percent by weight of 4,4'-BPADA is continuously pumped into a first leg of a Y-shaped tubing and a second methylene chloride solution containing 10 percent by weight of MDA is continuously and simultaneously pumped into a second leg of the Y-shaped tubing. The mass flow rates of the solutions are maintained at a ratio corresponding to 520 parts of the 4,4'-BPADA solution per 198 parts of the MDA solution, i.e. one mole of 4,4'-BPADA per mole of MDA. The resulting combined stream is continuously passed through the mixing zone of a Kenix ® static mixer having a sufficient length to provide a hold-up time of about 5 seconds. The mixer is connected to the third leg of the Y-shaped tubing. The mixture continuously exiting the mixer and containing a precipitate suspension is continuously pumped into the feed inlet of a spray drier operated with dry nitrogen (as the drying medium) supplied at about 70° C and at a mass flow rate sufficient to permit continuous withdrawal of the substantially solvent-free oligomeric amine-capped polyetheramide acid powder.

It is understood that the foregoing detailed description is given merely by way of illustration and that numerous modifications may be made therein without departing from the spirit or scope of the present invention.

What is claimed is:

1. A process for preparing oligomeric polyetheramide-acid, comprising reacting an aromatic dianhydride component selected from the group consisting of (a) aromatic bis(ether anhydride)s of the general formula

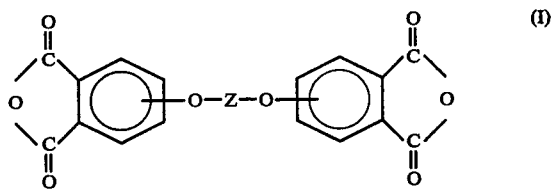

and (b) mixtures of one or more of said bis(ether anhydride)s with up to 30 mole percent benzophenone dianhydride of the general formula

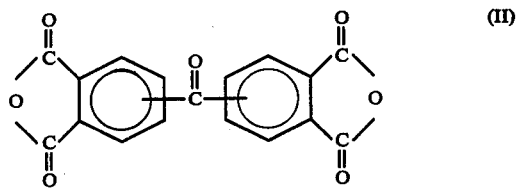

with at least one organic diamine of the general formula

in an inert organic liquid selected from the group consisting of (c) chlorinated hydrocarbon selected from the group consisting of methylene chloride, chloroform, 1,2-dichloroethane, and mixtures thereof and (d) mixtures of said chlorinated hydrocarbon with up to 50% by weight of acetone to form oligomeric polyetheramide-acid which is substantially insoluble in said liquid, where Z is a member selected from the class consisting of (a) divalent organic radicals having the following formulas

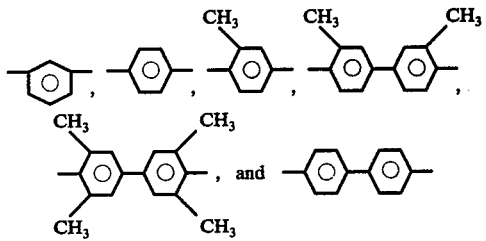

and (b) divalent organic radicals of the general formula

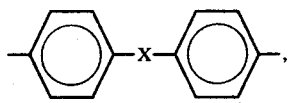

where X is a member selected from the class consisting of divalent radicals of the formulas

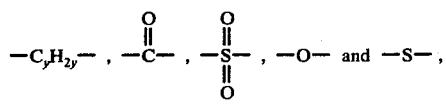

where $y$ is an integer from 1 to 5; and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the general formula

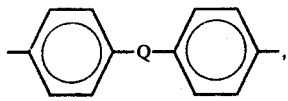

where Q is a member selected from the class consisting of
—O—, —S—, and —$C_xH_{2x}$—,
and $x$ is an integer from 1 to 5.

2. The process of claim 1, wherein the oligomeric polyetheramide-acid is formed as a precipitate of finely divided particles.

3. The process of claim 2, further including recovering said finely divided particles of oligomeric polyetheramide-acid.

4. The process of claim 3, wherein said recovering includes filtering, washing and drying said particles.

5. The process of claim 2, further including volatilizing substantially all of said liquid and recovering a particulate mixture of oligomeric polyetheramide-acid and any unreacted dianhydride and diamine.

6. The process of claim 1 wherein the end groups of the polyetheramide-acid are predominately amine groups.

7. The process of claim 1, wherein a first solution of said dianhydride component in an organic liquid selected from a first group consisting of methylene chloride; chloroform; and 1,2-dichloroethane; and mixtures thereof is admixed with a second solution of said diamine in an organic liquid selected from a second group consisting of methylene chloride; chloroform; 1,2-dichloroethane; acetone; and mixtures thereof.

8. The process of claim 7,
(A) wherein a stream of said first solution is continuously admixed with a stream of said second solution to form a third stream, and further including
(B) continuously passing the third stream through a mixing zone to intimately mix said diamine with said dianhydride component,
(C) continuously passing the intimately mixed third stream to a liquid-solids separation zone, and
(D) continuously recovering substantially dry finely divided particles of oligomeric polyetheramide-acid from said separation zone.

9. The process of claim 1, wherein the number average molecular weight of said polyetheramide-acid is below 5000.

10. The process of claim 1, wherein said reacting step is effected in a reaction mixture wherein the mole ratio of said diamine to said dianhydride component is from about 1 to about 1.5 moles of diamine per mole of dianhydride component.

11. The process of claim 2, wherein at least 90 percent by weight of the particles have an average particle size in the range from about 0.5 to about 70 microns.

12. The process of claim 2, wherein the reaction is effected in an agitated reaction mixture and the particles are substantially spherical.

13. The process of claim 1, where the dianhydride component is a member selected from the group consisting of compounds of the formulas

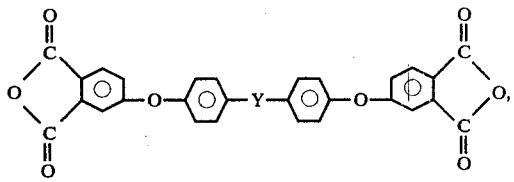

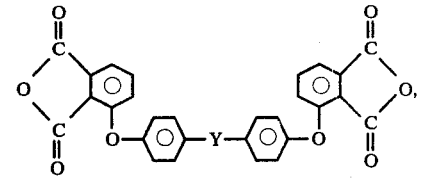

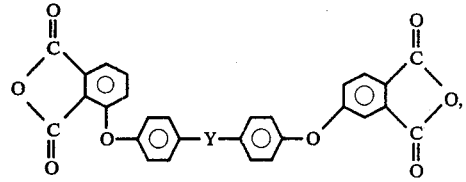

and mixtures thereof and Y is selected from the class consisting of —O—, —S—,

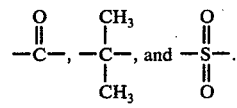

14. The process of claim 13, where the dianhydride component is selected from the group consisting of 2,2-bis[4-(3,4-dicarboxyphenoxy)phenyl] propane dianhydride, 2,2-bis[4-(2,3-dicarboxyphenoxy)phenyl] propane dianhydride, 4-(2,3-dicarboxyphenoxy)-4′-(3,4-dicarboxy phenoxy)-diphenyl-2,2-propane dianhydride, and mixtures thereof.

15. The process of claim 1, where the organic diamine is selected from the group consisting of 4,4′-oxydianiline, 4,4′-methylenedianiline, and m-phenylene diamine.

16. The process of claim 1, where the dianhydride component is 2,2-bis[4-(3,4-dicarboxyphenoxy)phenyl] propane dianhydride.

17. The process of claim 16, where the organic diamine is 4,4′-methylenedianiline.

18. The process of claim 17, where the organic liquid is methylene chloride.

19. The process of claim 1, wherein said reacting is effected at a temperature from 0° C to the boiling point of said organic liquid at the pressure employed.

20. The process of claim 19, wherein said temperature is from about 20° to about 30° C and said pressure is atmospheric.

* * * * *